United States Patent
Barthomeuf et al.

(10) Patent No.: US 8,874,320 B2
(45) Date of Patent: Oct. 28, 2014

(54) METHOD FOR DETERMINING THE UNDERSTEERING RATIO OF A VEHICLE PROVIDED WITH ELECTRIC POWER STEERING AND FOR OPTIONALLY CORRECTING THE POWER STEERING

(75) Inventors: Julien Barthomeuf, Saint Genis Laval (FR); Andre Michelis, Grigny (FR)

(73) Assignee: JTEKT Europe (FR)

( * ) Notice: Subject to any disclaimer, the term of this patent is extended or adjusted under 35 U.S.C. 154(b) by 211 days.

(21) Appl. No.: 13/140,974

(22) PCT Filed: Dec. 15, 2009

(86) PCT No.: PCT/FR2009/052537
§ 371 (c)(1),
(2), (4) Date: Sep. 12, 2011

(87) PCT Pub. No.: WO2010/070229
PCT Pub. Date: Jun. 24, 2010

(65) Prior Publication Data
US 2011/0320090 A1    Dec. 29, 2011

(30) Foreign Application Priority Data
Dec. 19, 2008 (FR) ........................ 0858842

(51) Int. Cl.
*B62D 6/00* (2006.01)
*B60W 40/12* (2012.01)

(52) U.S. Cl.
CPC .............. *B60W 40/12* (2013.01); *B62D 6/003* (2013.01); *B60W 2520/28* (2013.01)
USPC ......................................................... 701/42

(58) Field of Classification Search
CPC ... B60W 2520/28; B60W 40/12; B62D 6/003
USPC ............................................................ 701/42
See application file for complete search history.

(56) References Cited

U.S. PATENT DOCUMENTS

| | | | |
|---|---|---|---|
| 7,424,352 B2 * | 9/2008 | Matsunaga et al. | 701/42 |
| 2005/0103125 A1 * | 5/2005 | Desbiolles | 73/862.321 |
| 2005/0189161 A1 | 9/2005 | Zheng | |

FOREIGN PATENT DOCUMENTS

| | | | |
|---|---|---|---|
| DE | 102007000995 A1 * | 6/2009 | |
| EP | 0296756 A2 | 12/1988 | |
| EP | 1481872 A2 | 12/2004 | |

(Continued)

OTHER PUBLICATIONS

International Search Report PCT/FR2009/052537; Dated Mar. 10, 2010.

*Primary Examiner* — Helal A Algahaim
*Assistant Examiner* — Yazan A Soofi
(74) *Attorney, Agent, or Firm* — Cantor Colburn LLP

(57) ABSTRACT

The invention relates to a method for calculating the understeering ratio of automobiles provided with electric power steering (EPS) including an electric assistance motor (9) driven by an onboard electronic computer (11), a sensor (12, 14) providing a first piece of information on a real angular position of the steering wheel (3), a wheel anti-lock braking system (ABS) providing a second piece of information on the speed of the wheels (15) of the vehicle, characterised in that the onboard computer (11) of the EPS processes the second piece of information for estimating a theoretical angular position of the steering wheel (3), which is further compared to the real angular position of the steering wheel (3) in order to derive the understeering ratio ($\tau$) of the vehicle.

9 Claims, 2 Drawing Sheets

(56) References Cited

FOREIGN PATENT DOCUMENTS

| EP | 1607306 | A2 | | 12/2005 |
|---|---|---|---|---|
| EP | 2065291 | A1 | | 6/2009 |
| FR | 2861045 | A1 | | 4/2005 |
| FR | 2933364 | A1 | * | 1/2010 |

* cited by examiner

METHOD FOR DETERMINING THE UNDERSTEERING RATIO OF A VEHICLE PROVIDED WITH ELECTRIC POWER STEERING AND FOR OPTIONALLY CORRECTING THE POWER STEERING

TECHNICAL FIELD

The present invention generally relates to vehicles equipped with electric power steering (EPS) and an anti-lock braking system (ABS). The invention more particularly relates to a method for determining the understeering ratio for these vehicles and any correction of the assisted steering.

BACKGROUND

Depending on weather conditions, the state of the road or hazards encountered, driving an automobile can be complicated. Certain emergency situations require good control of the steering wheel.

In particular, when negotiating a turn, if the driver accelerates, a mass transfer occurs from the front towards the back of the vehicle. This mass transfer results in unballasting the front wheels of the weight of the vehicle, which can cause them to break away. The vehicle then performs what is called understeering.

Likewise, if a driver enters a turn too quickly and decelerates abruptly to reduce his speed (by releasing the accelerator, by excessively strong down-shifting, or with assistance from the brake pedal), a mass transfer occurs from the rear towards the front of the vehicle. This mass transfer results in unballasting the rear wheels of the weight of the vehicle, which can cause said wheels to lose traction. Weak deflection of the wheels towards the inside of the turn is then sufficient to push the vehicle into a rotational movement where the rear part of the vehicle will pass in front of the front portion. This is called understeering, or more commonly "swing-around."

Obviously, these reactions by the vehicle can be countered by steering maneuvers that require the acquisition of reflexes and a certain dexterity, which most people, who have the same tendency to brake harder when the vehicle begins oversteering, obviously do not have. These reactions can also be accentuated or decreased according to various parameters unique to the vehicle such as, for example, the traction of its tires, or its suspension, which, if too soft, causes an increase in the mass transfer as well as rolling, which pushes the vehicle towards the outside of the turn.

To help drivers in these emergency situations, certain vehicles are equipped with an electronic stability program (ESP).

ESP is an active security system that requires, in addition to a specific computer, additional sensors (absolute position sensor of the steering wheel, lateral acceleration and rate of yaw sensor) on one hand, and actuators on the braking system on the other hand. The ESP can also send a notification to the electric power steering to modify the assistance torque. All of this explains its high price and why it is only offered on top of the line vehicles or as an expensive extra feature. Furthermore, installing it can be complex and must take into account many parameters unique to each vehicle model.

BRIEF SUMMARY

The present invention aims to allow the electric power steering to detect a deviation as early as possible between the angular set-point at the driver's steering wheel and the vehicle's response without, unlike ESP, using a sensor or an additional actuator other than those of the electric power steering itself and the information available from the ABS.

To that end, the present invention relates to a method for determining the understeering ratio of automobiles provided with electric power steering (EPS) including an electric assistance motor driven by an onboard electronic computer, a sensor providing a first piece of information on a real angular position of the steering wheel, a wheel anti-lock braking system (ABS) providing a second piece of information on the speed of the wheels of the vehicle, characterized in that the onboard computer of the EPS processes the second piece of information for estimating a theoretical angular position of the steering wheel, which is further compared to the real angular position of the steering wheel in order to derive the understeering ratio of the vehicle.

This method therefore makes it possible to determine the understeering ratio of the vehicle by relating the value of the real absolute position of the steering wheel determined by a sensor at a given moment to an estimated value at that same moment of the theoretical angular position of the steering wheel of the vehicle derived from differential speed measurements between the wheels with different radii of curvature done by the ABS system. A ratio is thus obtained:

$$\tau = \frac{\theta_{real\ steering\ wheel}}{\theta_{estimated\ steering\ wheel}}$$

The value of this ratio first makes it possible to determine whether the vehicle is understeering, oversteering, or under normal driving conditions. Typically, if the value of the ratio is greater than $1+\epsilon$, where $\epsilon$ is the measurement uncertainty to be determined through simulation or trials and characteristic of each vehicle, the vehicle is under understeering conditions. If the value of the ratio is less than $1-\epsilon$, the vehicle is under oversteering conditions. If the value of the ratio is in the interval $1-\epsilon<\tau<1+\epsilon$, the vehicle is under normal driving conditions.

The comparison between these two values can also be done by calculating their difference rather than their ratio; it is thus possible to directly derive from the sign of the difference whether the vehicle is understeering or oversteering.

Such a method is relatively inexpensive to implement compared to an ESP system because it does not use additional sensors, actuators, and computers, but rather uses only those that are already installed in series vehicles equipped at minimum with electric power steering and an ABS system, which is the case for most modern vehicles.

In one embodiment, the first piece of information is provided by a dedicated angle sensor.

This sensor is generally positioned directly on the steering column. The information provided by this absolute sensor, whether multi-turn or not, is available as of initialization of the electronics of the electric power steering, when the vehicle is started.

Advantageously, the first piece of information is provided via a non-dedicated relative sensor associated with the electric assistance motor.

This arrangement makes it possible to do away with the use of an absolute zero angle sensor, which is costly and requires a large number of inputs to process its signal. The angular position of the steering wheel is no longer determined by a dedicated sensor, but by an estimate done from information relative to the position of the rotor of the electric assistance motor and provided by a sensor associated with the electric assistance motor.

In one embodiment, the calculated understeering ratio is used by a system for modifying the torque felt in the steering wheel.

This arrangement makes it possible to inform the driver of an imminent loss of traction or a trajectory deviation and push him, as early as possible, as a function of the understeering ratio, to return to the correct trajectory by modifying the torque felt in the steering wheel. The system for modifying the torque felt in the steering wheel is ideally incorporated into the electric power steering, in particular its computer and its electric motor, which will act dynamically on the torque felt in the steering wheel.

In the context of this same embodiment, the modification of the torque felt in the steering wheel is proportional to the calculated understeering.

This arrangement is a good compromise between the understeering ratio and the resistive torque felt in the steering wheel by the driver. Nevertheless, the present invention is in no way limited to a proportional function between the understeering ratio and the resistive torque felt in the steering wheel.

According to one embodiment, the system for modifying the torque felt in the steering wheel can be disconnected.

The driver thus remains free to impose an angle on the steering wheel and to keep a desired trajectory, which allows sports driving with side slip inasmuch as the driver can also disconnect the vehicle's ESP if it is provided.

According to another embodiment, the modification of the torque felt in the steering wheel is adapted to the type of steering done, typically to the right or left.

This arrangement makes it possible to apply a higher torque felt on one side than the other. In this way it is possible, for example in a country where drivers drive on the right, to more quickly and strongly limit the rotation of the steering wheel to the right to prevent understeering that would carry the vehicle off-course into the left lane of traffic and could cause a head-on collision with a vehicle driving in the opposition direction, which is much more dangerous than understeering carrying the vehicle to the side of the road in the direction of traffic.

According to still another embodiment, the modification of the torque felt in the steering wheel is adapted to the type of trajectory deviation, typically understeering or oversteering.

The origins of understeering and oversteering are not the same, and the "steering wheel turning" to deal with these situations is not the same. To counter understeering in the general case of a front-wheel drive vehicle, it is necessary to give the vehicle's front wheels traction again by releasing the accelerator and/or braking slightly while bringing the steering wheel as close as possible to its reference position to avoid oversteering. Then, after regaining traction, one need only bring the steering wheel back along the steering trajectory. To counter oversteering, still in the general case of a front-wheel drive vehicle, it is necessary to return traction to the rear wheels, before they pass in front of the front wheels, which would cause a "swing-around." To that end, it may not be necessary to decelerate, but on the other hand it is necessary to counter-steer in the direction opposite the turn to be made so that the transfer of mass from the rear to the front of the vehicle does not send the vehicle into a rotational movement around its front wheels. During counter-steering, it is very important not to brake, as this would intensify the oversteering. In both cases, it is therefore necessary to prevent the driver from turning the wheel further into the turn. In the case of understeering, the driver must be pushed to return the steering wheel to its reference position, and in the case of oversteering, the driver must be pushed to counter-steer by hardening the torque each time between the position of the steering wheel and the optimal position to offset either of these situations.

Advantageously, the system for modifying the torque felt in the steering wheel acts by decreasing the assistance torque from the electric assistance motor or in another embodiment, the system for modifying the torque felt in the steering wheel acts by increasing the assistance torque of the electric motor.

Both of these configurations are possible, and the method can therefore adapt to either of these configurations depending on the vehicle's original electric power steering.

BRIEF DESCRIPTION OF THE DRAWINGS

The invention will be better understood upon reading the following description, in reference to the appended diagrammatic drawings, which show, as examples, one embodiment of the inventive method.

DETAILED DESCRIPTION

Figure 1:
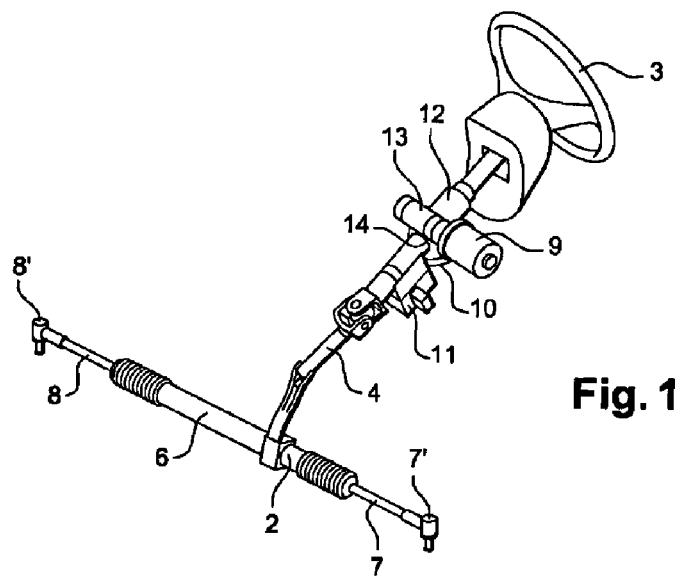
FIG. 1 is a diagrammatic perspective view of power assisted steering according to the state of the art.

FIG. 1 recalls the main component elements of a motor vehicle electric power steering system.

Such steering comprises, on one hand, a mechanical part generally designated by reference 2, comprising a steering wheel 3 connected to a steering column 4, whereof the end farthest from the steering wheel 3 supports a steering pinion engaged with a rack 5, slidingly mounted in a steering gearbox 6. The two opposite ends of the rack 5 are respectively connected, via connecting rods 7 and 8 each equipped on the outer end thereof with a steering ball joint 7' and 8', with hub carriers (not shown) for the right and left steering wheels of the concerned vehicle.

The steering comprises, to assist the manual force exerted by the vehicle's driver on the steering wheel 3, an electric assistance motor 9 with two directions of rotation, whereof the output shaft is coupled, via a speed reducer 10, in particular with worm and tangent wheel, to the steering column 4, so as to transmit a motor torque (and possibly a resistive torque) to the steering column 4.

The electric assistance motor 9 is driven by an onboard electronic computer 11, which receives and processes various signals, coming from sensors. In one traditional embodiment, the electronic computer 11 may receive an electric signal from a sensor 12 on the steering wheel 3 angle, representing the real instantaneous steering angle of the concerned vehicle, and this computer 11 also receives a signal from a torque sensor 13 placed on the steering column 4, and thereby measuring the torque exerted by the driver on the steering wheel 3.

In the illustrated example, a resolver 14 is also provided to detect the absolute angular position θ of the electric assistance motor 9 between two successive poles among the n statoric poles of that assistance motor 9, with $$0 < \theta < \frac{360}{n}$$

Aside from this miscellaneous information, the computer 11 drives the electric assistance motor 9, by defining a torque or assistance force, at any moment, able to amplify or, on the contrary, offset the force applied by the driver on the steering wheel 3, according to the predefined "assistance laws" programmed into a non-volatile memory of the computer 11.

Figure 2:
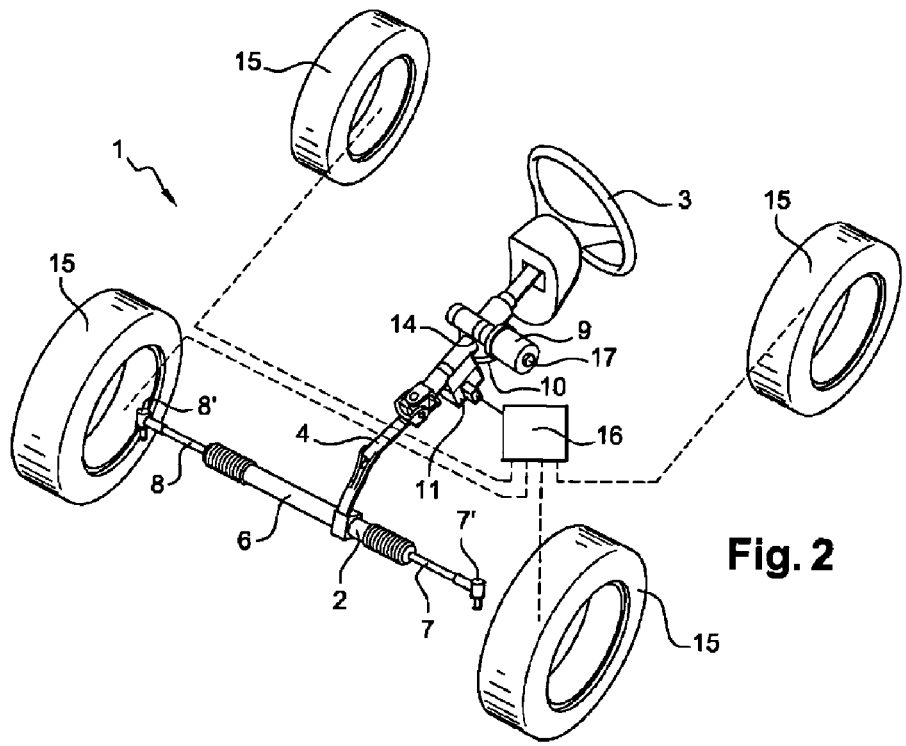
FIG. 2 is a diagrammatic perspective view illustrating the implementation of the method according to the invention in a vehicle.

The implementation of the method in a vehicle according to the invention shown in FIG. 2 uses, in addition to the electric power steering shown in FIG. 1, the antilock braking system ABS, which continuously informs the computer 11 about the speed of each of the wheels 15 via another dedicated computer 16. In the example shown, the method does away with the position sensor 12 for the steering wheel 3 angle, replacing it with an estimate done in the onboard electronic computer 11 from information relative to the position of the rotor of the electric assistance motor 9 and provided by the resolver 14 associated with the electric assistance motor 9.

The computer 11 processes this various information and uses it to derive an understeering ratio $\tau$ according to which it drives the system 17 for modifying the torque felt comparable to the electric assistance motor 9 in the example shown.

Figure 3:
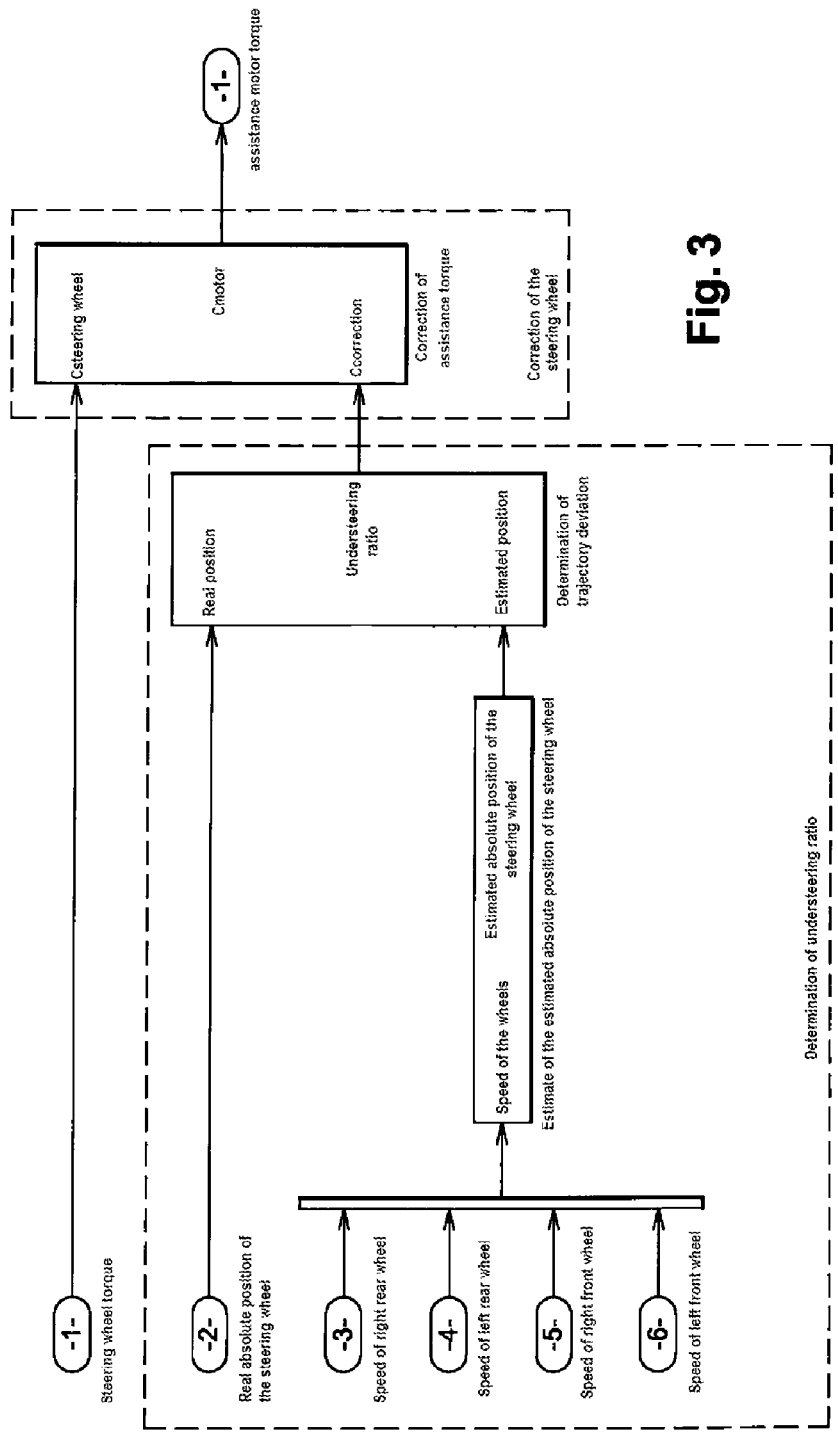
FIG. 3 is a block diagram illustrating the steps for carrying out the method.

In FIG. 3, the algorithm using the operating steps of the inventive method is broken down at minimum into two subsets forming two blocks A and B. A third subset C can be added.

Block A performs the estimate of a real absolute position of the steering wheel, either by recalibrating the resolver 14 with the angle sensor 12 incorporated into the steering column 4 or, advantageously because it does not require the use of an angle sensor 12, through a strategy using information relative to the position of the rotor of the electric assistance motor 9 and provided by the resolver 14 associated with this electric assistance motor 9.

In parallel, a theoretical position of the steering wheel 3 is estimated as a function of the analysis of the speed of the vehicle's wheels 15.

Indeed, it is possible to estimate an instantaneous absolute position of the steering wheel 3 through a calculation, analyzing the speeds of each of the wheels 15 of the vehicle, irrespective of the type of transmission: front-wheel drive, rear-wheel drive, or four-wheel drive.

Using the example of the two rear wheels, the average speed of the rear wheels can be obtained using the following formula:

$$V_{average\ rear\ wheels} = \frac{V_{rear\ left\ wheel} + V_{rear\ right\ wheel}}{2}$$

The speed deviation of the rear wheels is written:

$$E_{rear\ speeds} = V_{rear\ left\ wheel} - V_{rear\ right\ wheel}$$

The instantaneous sign of the steering is given by the sign of the speed deviation of the rear wheels, and conventionally, the sign is positive when the steering wheel is turned to the right and the sign is negative when the steering wheel is turned to the left.

Knowing the rear path V of the vehicle, the instantaneous radius R of the vehicle's trajectory is calculating from the following formula:

$$R = \frac{V_{average\ rear\ wheels}}{E_{rear\ speeds}} \times Path_{rear}$$

The radius R being determined, and knowing the wheelbase L of the vehicle, the Ackerman angle corresponding to the average turning angle of the steering wheels is calculated using the following formula:

$$\alpha_{Ackerman} = \frac{L}{R}$$

The lateral acceleration $Y_{lateral}$ of the vehicle, estimated from the instantaneous radius and the average speed of the vehicle, makes it possible to calculate the average drift angle $\alpha$ of the tires:

$$Y_{lateral} = \frac{(V_{average\ rear\ wheels})^2}{R}$$

$$\alpha_{theoretical\ deviation} = K(R) \times Y_{lateral}$$

The relationship between the understeering gradient K and the turning radius R is unique to each vehicle model. This relationship is provided in a table stored in non-volatile memory in the computer 11.

The theoretical deviation angle is corrected by a correction gain G that depends on the characteristic lateral acceleration of the vehicle:

$$\alpha_{deviation} = G(Y_{lateral}) \times \alpha_{theoretical\ deviation}$$

The average turning angle of the steering wheels is equal to the sum of the Ackerman angle and the average deviation angle of the tires:

$$\alpha_{steering\ wheels} = \alpha_{Ackerman} + \alpha_{deviation}$$

There is a relationship between the absolute angular position of the steering wheel and the turning angle of the steering wheels, characteristic of each vehicle model. This relationship is provided in a table stored in non-volatile memory in the computer.

$$\theta_{absolute\ steering\ wheel} = f(\alpha_{steering\ wheels}) \text{ therefore}$$

$$\theta_{estimated\ steering\ wheel} = f(\alpha_{steering\ wheels})$$

Block B performs the calculation of the understeering ratio. The information on the wheel speeds 15 is provided periodically by the ABS computer 16 to the electric power steering computer 11 on the vehicle's multiplexed Controller Area Network (CAN) network. The ABS computer 16 calculates the wheel speeds 15 by processing signals coming from the sensors of each wheel 15.

When the driving conditions are met (limited slip and drift), the instantaneous estimated theoretical position is substantially equal to the real absolute position of the steering wheel 3, and it is under these conditions that the resolver 14 associated with the electric power steering is recalibrated and becomes equivalent to a multi-turn, single-turn, or relative absolute angle sensor 12 incorporated into the electric power steering.

When the loss of traction of one of the vehicle's two axle systems (front or rear) becomes significant, a deviation appears between the position of the steering wheel 3, either measured by an angle sensor 12 or calculated from the position of the motor 9 of the electric power steering, and the instantaneous estimated theoretical position.

This deviation makes it possible to determine the understeering ratio to determine whether the vehicle is understeering or oversteering.

This understeering ratio is only the ratio of the real absolute steering wheel angle and the instantaneous estimated steering wheel angle.

$$\tau = \frac{\theta_{real\ steering\ wheel}}{\theta_{estimated\ steering\ wheel}}$$

Block C corrects the assistance torque. From the understeering ratio, it is possible to correct the assistance torque according to the dynamic driving conditions without outside indications, e.g. from the ESP.

A predefined neutral zone makes it possible to determine the authorized deviation tolerance before triggering a corrective torque. Beyond that neutral zone, a corrective torque can be calculated, in proportion to the trajectory deviation.

In that case, a torque limiter makes it possible to keep the corrective torque in an acceptable range. In particular, the corrective torque must be felt, but it must not prevent maneuvers to the left, as to the right, irrespective of the circumstances.

When the corrective torque is zero, the electric assistance motor torque is applied according to the original assistance laws.

When the corrective torque is not zero, the torques at the input and output of the assistance laws are modified, so that the steering wheel torque is increased by the value of the corrective torque.

Of course, the invention is not limited solely to the embodiment described above as an example; on the contrary, it encompasses all alternative embodiments of this method. In particular, it would not be beyond the scope of the invention if the information on the wheel speeds were provided indirectly by the ABS computer 16 via the computer of another system using that information, such as the ESP system's computer.

The invention claimed is:

1. A method for determining an understeering ratio of a vehicle provided with:
   electric power steering (EPS) including an electric assistance motor driven by an onboard electronic computer, the method including the following steps:
   a sensor providing a first piece of information on a real angular position of a steering wheel,
   a wheel anti-lock braking system providing a second piece of information on a speed of wheels of the vehicle,
   processing the second piece of information by the onboard electric computer of the electric power steering to estimate a theoretical angular position of the steering wheel, and
   comparing the theoretical angular position of the steering wheel to the real angular position of the steering wheel in order to deduce the understeering ratio of the vehicle,
   using the understeering ratio such that the electric assistance motor modifies the torque felt in the steering wheel to push a driver to return to a correct trajectory,
   adapting the modification of the torque felt in the steering wheel to the type of trajectory deviation having an understeering or an oversteering such that during the understeering, the driver is pushed to return the steering wheel to its reference position, and during the oversteering, the driver is pushed to counter-steer.

2. The method according to claim 1, wherein the first piece of information is provided by a dedicated angle sensor.

3. The method according to claim 1, wherein the first piece of information is provided via a non-dedicated relative sensor associated with the electric assistance motor.

4. The method according to claim 1, wherein the modification of the torque felt in the steering wheel is proportional to the calculated understeering ratio.

5. The method according to claim 1, wherein the system for modifying the torque felt in the steering wheel can be disconnected.

6. The method according to claim 1, wherein the modification of the torque felt in the steering wheel is adapted to a type of steering comprising rightward or leftward.

7. The method according to claim 1, wherein the system for modifying the torque felt in the steering wheel acts by decreasing assistance torque from the electric assistance motor.

8. The method according to claim 1, wherein the system for modifying the torque felt in the steering wheel acts by increasing the assistance torque of the electric motor.

9. The method according to claim 6, comprising applying a higher torque felt on one side than the other side, so as to more quickly and strongly limit the rotation of the steering wheel to the side corresponding to the traffic lane's side of the vehicle, to prevent understeering that would carry the vehicle off-course into the lane of opposite traffic direction and could cause a head-on collision with a vehicle driving in said opposite direction.

* * * * *